J. F. HAUSSMANN.
MOTORCYCLE CLUTCH.
APPLICATION FILED JUNE 8, 1918.

1,317,290.

Patented Sept. 30, 1919.
2 SHEETS—SHEET 1.

WITNESS:
J. P. Britt

INVENTOR
John F. Haussmann
BY
Geo. W. Young
ATTORNEY

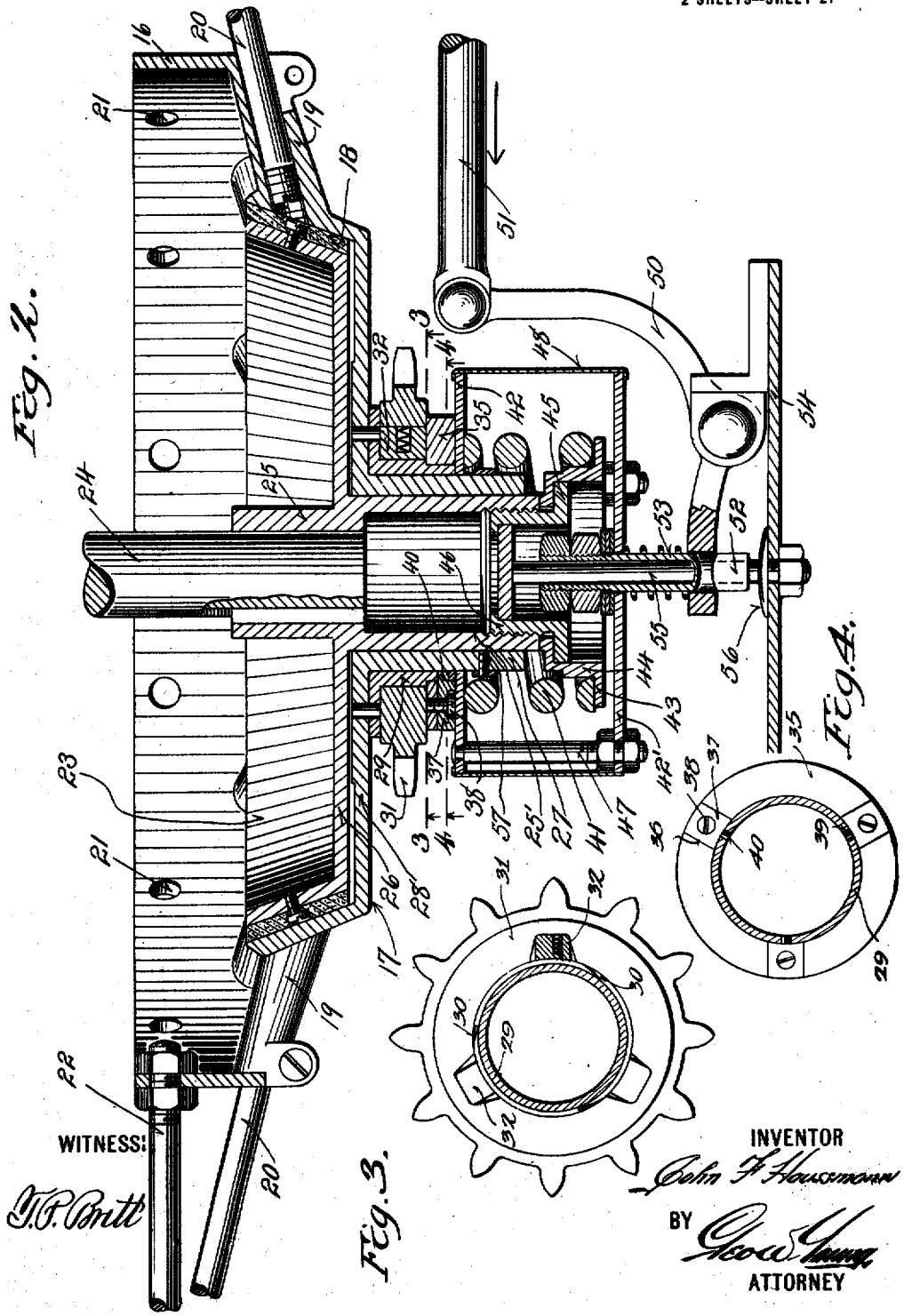

UNITED STATES PATENT OFFICE.

JOHN F. HAUSSMANN, OF MILWAUKEE, WISCONSIN, ASSIGNOR OF ONE-HALF TO BADGER-PACKARD MACHINERY CO., OF MILWAUKEE, WISCONSIN.

MOTORCYCLE-CLUTCH.

1,317,290. Specification of Letters Patent. Patented Sept. 30, 1919.

Application filed June 8, 1918. Serial No. 238,902.

*To all whom it may concern:*

Be it known that I, JOHN F. HAUSSMANN, a citizen of the United States, and resident of Milwaukee, in the county of Milwaukee and State of Wisconsin, have invented certain new and useful Improvements in Motorcycle-Clutches; and I do hereby declare that the following is a full, clear, and exact description thereof.

This invention relates to new and useful improvements in motorcycles of that general type wherein the motor is located centrally of the rear wheel.

The general object of the invention is to improve upon the motor cycle illustrated in my pending patent application Serial No. 186,994, filed August 18, 1917.

An additional and particular object is to provide a motorcycle of the above described type with a clutch whereby the power of the motor is under the control of the operator at all times.

An additional object is to provide a clutch controlled motorcycle of this general character with a protective means whereby the operating parts of the clutch will be housed against possible injury should the motorcycle accidentally fall over.

With these and minor objects in view the invention resides in novel features of construction, combination and arrangement of parts which will be hereinafter more particularly described, claimed and shown in the drawings wherein:

Fig. 2 is an enlarged detailed horizontal sectional view through the clutch mechanism and coöperative parts.

Figure 1:
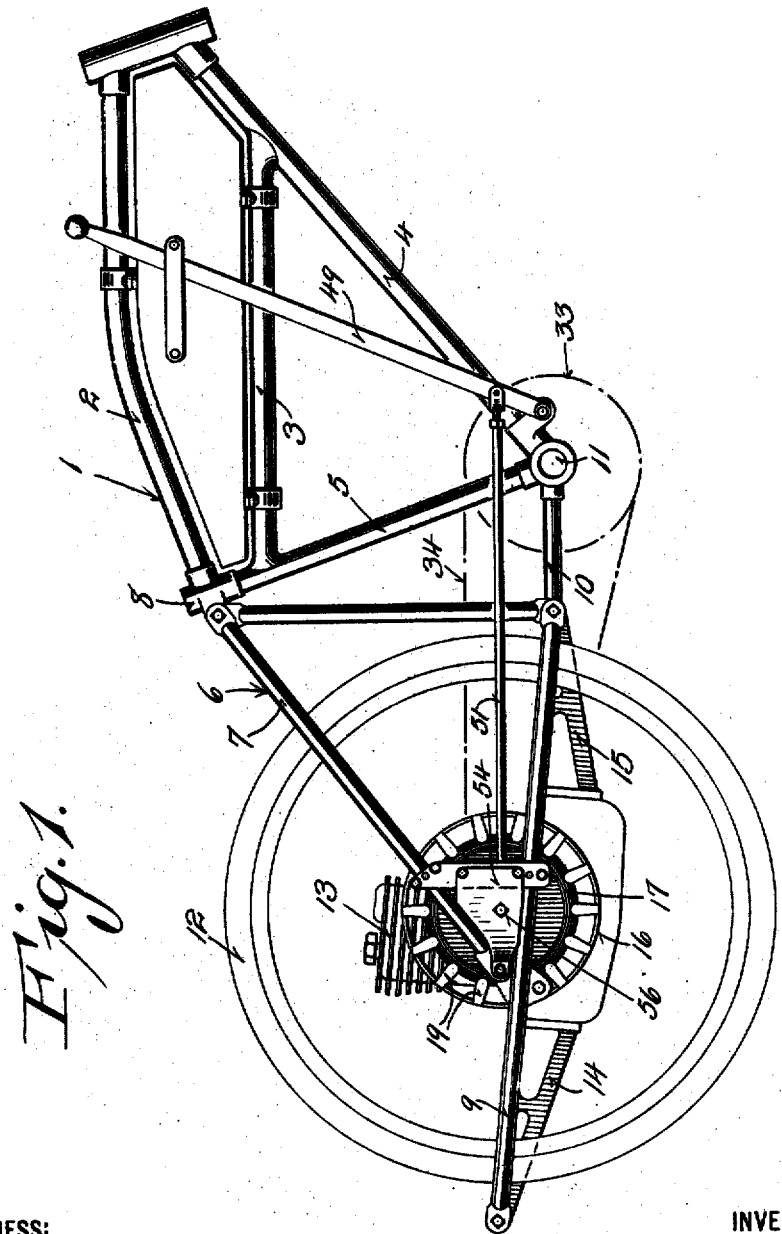
Figure 1 represents an elevational view of a portion of the motorcycle frame equipped with a motor driven clutch controlled wheel constructed in accordance with my invention.

Figs. 3 and 4 are vertical transverse sectional views taken respectively on the planes of the lines 3—3 and 4—4 of Fig. 2.

In the accompanying drawings only so much of a motorcycle frame has been illustrated as is necessary to show the relation of my invention thereto. In said drawings 1 donates a cycle frame including upper and lower reach bars 2 and 3 respectively, a head bar 4, seat mast 5, and rear fork structure 6. This structure 6 is formed of a pair of downwardly and rearwardly inclined and rearwardly diverging upper fork bars 7 which are secured at their upper ends to the seat mast cluster bracket 8 and have their lower ends pivoted to the intermediate portions of a pair of substantially horizontal, oppositely and outwardly bowed lower fork bars 9; the forward ends of the bars 9 are connected with rearwardly extending bars 10 which project from the pedal shaft bearing 11.

The lower fork bars 9 are bowed sufficiently to receive a rear ground engaging wheel 12, as well as an internal combustion engine 13, therebetween, and the rear ends of said bars are secured together and to the free end of a rearwardly extending arm 14 which projects from the crank case of the engine 13; a similar arm 15 extends from the front of the crank case of said engine and is secured at the intersection of the bars 9 and 10.

The hub portion of the wheel 12 comprises a circular hub band 16, and a shiftable clutch member 17, the annular clutch face 18 of which is connected with the band 16 by a plurality of radially extending tubular arms 19. The openings of said arms 19 are inclined and adapted to receive the inner ends of spokes 20 the outer ends of which are secured to the rim of the wheel. The band 16 is provided with a series of apertures 21 which receive the inner end of supplemental spokes 22 whose outer ends are also secured to the wheel rim.

The clutch used with the foregoing described parts is of the cone type, and in addition to the shiftable clutch member 17 includes a relatively stationary clutch member 23 which is fixed to one end of a countershaft 24 extending from one side of the engine 13. This securement is effected by means of a sleeve 25 that extends on opposite sides of the radial wall 26 of the clutch member 23 and centrally thereof. The outer portion 25' of the sleeve provides a spindle bearing for a sleeve 27 extending outwardly from the radial wall 28 which forms a portion of the shiftable clutch member 17.

Disposed on the sleeve 27 and secured to the wall 28 is a ratchet clutch band 29 having a plurality of ratchet notches 30 cut therein as most clearly shown in Fig. 3. A sprocket 31 is adapted to be disposed around this band 29 and has a plurality of inwardly pressed dogs 32 for engagement with the shoulders of the ratchet notches when the same is rotated in one direction, as for instance by the rotation of the sprocket wheel 33 and chain 34.

This sprocket 31 is held in operative position on the band 29 by a retaining ring 35 disposed outwardly of said sprocket and secured to said band. To procure such an arrangement, the ring is provided with a plurality of key-ways 36 in which keys 37 are disposed and secured by fastening elements 38. The band 29 is provided with a like number of transverse holes 39 which receive pins 40 carried by the keys 37.

It will be noted that so long as the outer or shiftable clutch member is forced inwardly toward the relatively stationary clutch member that their respective clutch faces will be in engagement and the wheel will be caused to rotate with the motor driven shaft 24. These parts are retained normally in this position by an expansile coiled spring 41 which is disposed around the sleeve 27, one end being in contact with an inner spring plate 42, while its other or outer end engages the flange 43 of an annular spring seat 44. Said seat 44 is removably held against the outer end of the sleeve portion 25' by the engagement therewith of the radial flange 45 of the plug 46, the latter being threaded in the outer end of said sleeve portion 25'.

The inner spring plate 42 is circular and is adapted to cooperate with a similar circular plate 42' which is positioned outwardly of the spring seat 44 and held in rigid spaced relation with the former by bolts 47. These two plates 42 and 42' provide the inner and outer ends of a spring housing, the same being completed by an annular sheet metal covering 48. The spring and other movable parts are thus protected from dust and the like.

Whenever the inner spring plate 42 is moved away from the retaining ring 35 the shiftable member of the clutch is no longer held in said engagement with the relatively stationary member so as to cause operative co-action therebetween. This release of the clutch is carried out at the will of the operator of the machine by the shifting of a handle lever 49 pivotally carried by the frame 1 of the motorcycle. Such handle lever is connected with one arm of a bell crank lever 50 by a link 51, the other arm of the former being engaged with the head 52 of a headed sleeve 53 which is connected to the outer plate 42'. Said bell crank lever 50 is pivoted to the inner surface of a guard plate 54 which is secured to one of the fork bars 7 and the adjacent fork bar 9.

Although the guard plate 54 will, to a certain extent protect the clutch mechanism, it is desirable that the pivot of the bell crank lever remain in one position. Therefore, an additional protective arrangement is provided for reinforcing the guard plate 54, such consisting of a rod 55 which is disposed through the sleeve 53. The inner end of the rod 55 engages a rigid portion of the engine 13, for instance the plug 46, while the outer end engages a reinforcing member 56 which is secured to the guard plate 54. Thus, should the motorcycle fall so that the clutch mechanism is liable to engage the ground, the guard plate 54 will be prevented from being bent and the clutch mechanism will be protected against injury by the very rigid arrangement produced by the rod 55.

As hereinbefore mentioned, the spring 41 normally causes the clutch members to co-operate inasmuch as the inner end of said spring is indirectly engaged with the shiftable clutch member. When it is desired to release the clutch the handle lever 49 is shifted, the bell crank lever 50 rocked, and the spring compressed between the plate 42 and the flange 43. The plate 42 is held against outward movement toward the other plate 42' by a retaining band 57 which is secured adjacent the outer end of the sleeve 27. Upon release of the tension of the spring 41 the clutch members will be again forced into tight engagement.

I claim:—

1. In a device of the class described, a relatively fixed clutch member including a cylindrical extension, an annular flange on said extension, a relatively shiftable clutch member surrounding the cylindrical extension, a spring plate surrounding the cylindrical extension and normally engaging the shiftable clutch member, an expansion spring disposed around said extension, one end engaging said spring plate and the other the flange, a second plate, means connecting said second plate and the spring plate to hold the same in spaced relation, a headed stud extending from the center of the second plate, an angle lever having one arm engaged with the head of the stud, and means connected with the other arm for operating the lever.

2. A machine of the class described comprising in combination, a vehicle frame, operating means carried thereby including a clutch mechanism having relatively shiftable and non-shiftable portions, a rod extending from a non-shiftable portion of the clutch mechanism, and a guard plate secured to the frame outwardly of the movable portions of the clutch mechanism, said rod being engaged with said guard plate.

3. A machine of the class described comprising in combination, a vehicle frame, operating means carried thereby including a clutch mechanism having relatively shiftable and non-shiftable portions, an operating sleeve extending from the relatively shiftable portion of the clutch mechanism, a rod extending from a non-shiftable portion of the clutch mechanism and disposed through said sleeve, the latter being slidable thereon, the outer end of said rod being disposed beyond the adjacent end of the sleeve, and a guard plate secured to the frame outwardly of the movable portions of the clutch mechanism, said rod being engaged with the guard plate.

4. A machine of the class described comprising in combination, a vehicle frame, operating means carried thereby including a clutch mechanism having relatively shiftable and non-shiftable portions, an operating sleeve extending from the relatively shiftable portion of the clutch mechanism, a rod extending from a non-shiftable portion of the clutch mechanism and disposed through said sleeve, the latter being slidable thereon, the outer end of said rod being disposed beyond the adjacent end of the sleeve, a guard plate secured to the frame outwardly of the movable portions of the clutch mechanism, said rod being engaged with the guard plate, an angle lever fulcrumed on the inner side of the guard plate, and having one arm connected with said operating sleeve, and means for rocking the lever.

In testimony that I claim the foregoing I have hereunto set my hand at Milwaukee, in the county of Milwaukee and State of Wisconsin.

JOHN F. HAUSSMANN.

Copies of this patent may be obtained for five cents each, by addressing the "Commissioner of Patents, Washington, D. C."